US011405800B2

(12) United States Patent
Gupta et al.

(10) Patent No.: US 11,405,800 B2
(45) Date of Patent: Aug. 2, 2022

(54) SYSTEM AND METHOD FOR 3D PROPAGATION MODELLING FOR PLANNING OF A RADIO NETWORK

(71) Applicant: Reliance Jio Infocomm Limited, Mumbai (IN)

(72) Inventors: Deepak Gupta, Navi Mumbai (IN); Gaurav Dalwadi, Navi Mumbai (IN); Brijesh I Shah, Navi Mumbai (IN); Nekiram Khosaya, Navi Mumbai (IN)

(73) Assignee: Jio Platforms Limited, Gujarat (IN)

( * ) Notice: Subject to any disclaimer, the term of this patent is extended or adjusted under 35 U.S.C. 154(b) by 10 days.

(21) Appl. No.: 17/261,388

(22) PCT Filed: Jul. 16, 2019

(86) PCT No.: PCT/IB2019/056050
§ 371 (c)(1),
(2) Date: Jan. 19, 2021

(87) PCT Pub. No.: WO2020/016765
PCT Pub. Date: Jan. 23, 2020

(65) Prior Publication Data
US 2021/0345129 A1 Nov. 4, 2021

(30) Foreign Application Priority Data
Jul. 17, 2018 (IN) .............................. 201821026563

(51) Int. Cl.
*H04W 16/18* (2009.01)
(52) U.S. Cl.
CPC ................... *H04W 16/18* (2013.01)
(58) Field of Classification Search
CPC .. H04J 2203/0062; H04L 1/242; H04L 1/244; H04L 12/26; H04L 12/2697;
(Continued)

(56) References Cited

U.S. PATENT DOCUMENTS 9,338,787 B2   5/2016 Gloss
2008/0062942 A1*  3/2008 Hills ................... H04W 52/245
                                                           370/338

(Continued)

FOREIGN PATENT DOCUMENTS

CN         102195690 A      9/2011

OTHER PUBLICATIONS

International Search Report, PCT/IB2019/056050, filed Jul. 16, 2019, 3 pages.

(Continued)

*Primary Examiner* — Jung Liu
(74) *Attorney, Agent, or Firm* — Finnegan, Henderson, Farabow, Garrett & Dunner (57) ABSTRACT

A system and method for 3D propagation modelling for planning of a radio network, is disclosed. In the present invention, automatic tuning of propagation path loss parameters of a Continuous Wave (CW) based 3D propagation model for LOS (line of sight) and NLOS (non-line of sight) radio transmissions in a first geographical area, is performed. Further, in the present invention, 3D propagation models for remaining geographies having similar geographical area and clutter types as the first geographical area, are generated without performing any drive test while compensating the propagation path loss parameters of the generated model using periodically measured user equipment (UE) data. The generated 3D models may be updated dynamically as the 3D models are developed based on UE data updated from time to time.

20 Claims, 11 Drawing Sheets

(58) Field of Classification Search
CPC ..... H04L 43/50; H04L 5/0035; H04L 5/0055; H04L 5/0057; H04L 12/2869; H04L 12/5695; H04L 47/00; H04L 47/70; H04L 47/78; H04L 47/821; H04L 47/827; H04Q 1/20; H04Q 11/045; H04W 72/04
See application file for complete search history.

(56) References Cited

U.S. PATENT DOCUMENTS

2015/0126209 A1\* 5/2015 Gloss .................. H04W 72/085
                                                                    455/452.1
2019/0200346 A1\* 6/2019 Cui .................... H04W 52/0212

OTHER PUBLICATIONS

Written Opinion of the International Searching Authority, dated Nov. 29, 2019, 5 pages.

\* cited by examiner

SYSTEM AND METHOD FOR 3D PROPAGATION MODELLING FOR PLANNING OF A RADIO NETWORK

TECHNICAL FIELD

The present invention relates generally to wireless network, and more particularly, to 3D propagation modelling for planning of a radio network.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today with the advent of wireless technology like GSM, EDGE, HSPA, LTE, and the like, all communications in a wireless network provide various communication services such as voice, video, data, advertisement, content, messaging, broadcasts, etc. One example of such a network is the Evolved Universal Terrestrial Radio Access (E-UTRA) which is a radio access network standard meant to be a replacement of the UMTS and HSDPA/HSUPA technologies specified in 3GPP releases 5 and beyond. E-UTRA is the air interface of 3GPP's Long Term Evolution (LTE) upgrade path for mobile networks. Unlike HSPA, LTE's E-UTRA is an entirely new air interface system, unrelated to and incompatible with W-CDMA. It provides higher data rates, lower latency and is optimized for packet data. The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. With the capacity and higher data transfer speeds, there are many problems associated with the cells and the optimization of the cells.

In 4G cellular deployment, macro cells, along with various small cells, are planned to provide coverage and capacity solution across the target area. Thus, inter-site distance becomes narrower for LTE network, particularly with band 40 than 2G/3G radio access network. Further, a greater number of sites/eNodeBs are required to mitigate on-going data demand in the LTE network, which creates dense to hyper-dense radio access network in big cities.

The Radio Frequency (RF) characteristics (e.g., RF propagation) define the area of coverage for a cell tower. A sector is a geographical area, having a distinct size and shape, covered by a single antenna. For example, a service provider may use several antennas to provide 360 degrees of RF coverage for a cell. A service provider may use one cell tower to provide wireless communication services to subscribers for a few tens of meters radius in urban settings, while for a rural area, the service provider may use one cell tower for an area of several square miles. To ensure a good quality of experience for subscribers and maximum usage of the network, every service operator needs a complete view of the network and the ability to accurately analyze different deployment scenarios. The accuracy of RF Planning has a direct impact on how the network scenario can be optimized in order to maximize network capacity, coverage and network performance. The calibration of RF planning is often required when deploying in new frequency bands and new geographical areas.

Today, most of the operators perform the initial RF planning based on link budget and standard propagation model with low-resolution map data. The RF planning is a multi-step process and iterative in nature and is a very vital step for a wireless communication technology and is carried out manually by changing physical parameters of a site, as per the conventional approach. LTE radio network planning also works just like other cellular technologies. Whenever new cellular technology is considered for mass deployment, many RF parameters are subjected to a tuning process with a view to find out an optimum value. However, this phase is time-consuming and is expensive. Therefore, before commercial deployment, if an extensive simulation is carried out, then the tuning phase can be facilitated in numerous ways. Hence, running simulation before mass commercial deployment minimizes the cost with a greater extent. Clearly, optimizing vital parameters in a least possible time is a challenging issue for network operators. The RF planning tool based prediction is an essential requirement in the process of network planning.

The conventional techniques for modeling RF propagation are based on either empirical measurements or ray-tracing methods. Empirical methods, for example, are based solely on extensive measurements made in generic settings at different sites, and are therefore dependent on the site locations, the measurement methods, measurement frequencies, and the like. In particular, the signal strength is measured at a number of different locations and at different heights, with different empirical models used for different generic propagation problems, e.g. for rural, suburban, and urban propagation environments. However, there is no consideration of details of the propagation environment, e.g. actual building and street locations and configurations. Therefore, while empirical methods can predict order-of-magnitude of average propagation loss, they cannot predict fine details about the propagation channel like dead zones and multipath interference. Moreover, empirical methods are based on statistics regarding experiments without sufficient underlying logic to enable generalization to environments other than those in which the experiments were conducted.

The method of ray-tracing is a deterministic method which is based on geometrical optics and the uniform theory of diffraction (UTD) and can be used to calculate propagation mechanisms such as the direct (LOS), reflected, transmitted, diffracted, and some combined rays. The ray-tracing method is not based on extensive measurements, but rather relies on site-specific information such as actual geometric and structural information of the building, e.g. the façade structure and geometry. The basic procedure of the ray-tracing method is the shooting-and-bouncing ray (SBR) algorithm involving three basic processes, with the first process launching a ray. The second process is determining if the ray hits an object in what is known as the ray-object intersection test. Moreover, the third is determining whether a ray is received at a receiver location.

The accuracy of simulation-based data with actual measured data directly depends upon the accuracy of the clutter map and its propagation model. Nowadays, there are many empirical propagation models available. All these can be broadly classified in two ways:

(i) 2D propagation model
(ii) 3D propagation model

The 2D propagation models such as Standard Propagation Model (SPM) are widely used in RF planning; but are less accurate because of non-consideration of high-resolution clutter map, actual building height and multipath effects in simulation. Conventionally, CW measured drive test data is required to develop any propagation model. But to perform CW measurement in all cities or towns and calibrating propagation model are time consuming and very expensive for large scale network deployment.

Standard Propagation Model (SPM) is one of the most popular 2D propagation model. It is represented by (1).

$$L_{model}=K_1+K_2 \cdot \log_{10}(d)+K_3 \cdot \log_{10}(H_{Txeff})+ \\ K_4 \cdot \text{DiffractionLoss}+K_5 \cdot \log_{10}(d) \cdot \log_{10}(H_{Txeff})+K_6 \cdot \\ (H_{Rxeff})+K_{clutter} \cdot f(\text{clutter}) \quad (1)$$

Where,
$K_1$—constant offset (dB)
$K_2$—Multiplying factor for $\log_{10}$ (d)
d—Distance between transmitter and receiver (m)
$K_3$—Multiplying factor for $\log_{10}$ (HTxeff)
$H_{Txeff}$—Effective height of the transmitter antenna (m)
$K_4$—Multiplying factor for diffraction calculation
$K_5$—Multiplying factor for $\log_{10}$ (d)·$\log_{10}$ ($H_{Txeff}$)
$K_6$—Multiplying factor for $\log_{10}$ ($H_{Rxeff}$)
$H_{Rxeff}$—Effective UE antenna height (m)
$K_{clutter}$—Multiplying factor for f (clutter)
f (clutter)—Average of weighted losses due to clutter 2D propagation model such as SPM uses the raster data and Digital Terrain Map (DTM). DTM carries the details of geographical terrain height from sea level. Raster layer comprises the details of various clutters like dense urban, medium urban, suburban, rural, low vegetation, dense vegetation, water bodies, open area etc. with mean clutter height. The resolution of the raster layer could be in between 5-100 m. This impacts highly on the accuracy of the prediction performance.

Apart from the above-described drawbacks, one of the drawbacks with 2D propagation model is a separate model requirement for each morphology. Dense urban, medium urban, suburban and rural etc. require separately tuned 2D propagation models. Even for metro cities, the clutter variation is also large, which increases the number of propagation model tuning requirement for each clutter type. In an urban environment, SPM based predictions can only provide an idea of the received signal. Moreover, in densely populated areas, SPM based predictions may only provide a rough estimate of the received signal around the base station, as coverage is highly impacted by surrounding obstacles.

Apart from SPM, 3D propagation model works on 3D ray tracing phenomenon and consider effects of canyoning, power delay spread, diffusion and multipath signals. It requires DTM along with either 3D building vector map or raster layer with Digital Height Map (DHM). The resolution of 3D building vector map and DHM may lie in between 2-10 m. Ray tracing model also includes reflection, refraction and diffusion coefficients, which makes it more precisely accurate and suitable for the urban environment compared to 2D propagation model. Further, an entire city can have a unique 3D propagation model rather than morphology wise different models as required in the 2D case. In one example, one of the 3D propagation models is presented as below.

$$\text{Received Power}=EIRP-(A(\text{far,near})+B \cdot \log_{10}(D)+ \\ \gamma \cdot L_{DET}+L_{ANT}+L_{TS}+L_C) \quad (2)$$

Where,

EIRP—Sum of the transmit power plus the maximum antenna gain (dBm)
D—Tx-Rx distance (m)
$L_{DET}$—Deterministic loss from direct-path or from multi-path combination (dB)
$L_{ANT}$—Antenna loss from direct-path or from multi-path combination, including antenna correction (dB)
$L_{FS}$—Propagation loss in free-space at a distance 1 m (dB)
$L_C$—Clutter loss, including clutter attenuation and in-building propagation loss (dB)
A—Additional loss (dB) ($A_{near}$ for the receivers in the near area, $A_{far}$ for the receivers in the far area)
B—Additional loss per distance decade (dB/dec) ($B_{near}$ for the receivers in the near area, $B_{far}$ for the receivers in the far area)
γ—Weight of the deterministic loss However, key problems in the current modelling solutions are:

1. While tuning the propagation path, there are loss parameters for Line-of-sight (LOS) and Non-line-of-sight (NLOS) in the existing CW based ray tracing propagation models.
2. The conventional 3D propagation model cannot create modelling having a similar geographical area and clutter types without performing any drive test.
3. It is not possible to provide accurate 3D propagation models due to channel interfering noise of the measured frequency channel.
4. The prior arts fail to provide accurate 3D propagation models that can be tuned automatically based on periodically captured UE data.

Therefore, there is a need to alleviate drawbacks existing in the prior arts.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a method of 3D propagation modelling for the planning of a radio network. The method includes collecting, by a processor, one or more first network parameters of a radio network across one or more radio network sites in a first geographical region, wherein the one or more first network parameters are collected from a Radio Frequency (RF) scanner and from at least one user equipment (UE) simultaneously. The method further includes performing, by the processor, a prediction analysis for planning of the network across the one or more radio network sites, wherein the prediction analysis is performed by using a Continuous-Wave (CW) based 3D propagation model with the collected one or more first network parameters, wherein based on the prediction analyses, one or more second network parameters for each of the one or more radio network sites are generated. Further, the method includes optimizing, by the processor, the 3D propagation model used for the planning of the radio network in the first geographical region, by tuning one or more propagation path loss parameters of the 3D propagation model to compensate for propagation path losses associated with a Line-of-sight (LOS) transmission and a Non-line-of-sight (NLOS) transmission in the radio network, the tuning being performed based on a comparison of the generated one or more second network parameters with the at least one Key Point Indicator (KPI) of the 3D propagation model.

Further, the embodiments of the present disclosure may relate to a network entity for 3D propagation modelling for the planning of a radio network. The network entity includes a processor configured to collect one or more first network parameters of a radio network across one or more radio network sites in a first geographical region, wherein the one or more first network parameters are collected from a Radio Frequency (RF) scanner and from at least one user equipment (UE) simultaneously. Further, the processor is configured to perform a prediction analysis for planning of the network across the one or more radio network sites, wherein the prediction analysis is performed by using a Continuous-Wave (CW) based 3D propagation model with the collected one or more first network parameters, wherein based on the prediction analysis, one or more second network parameters for each of the one or more radio network sites are generated. Furthermore, the processor is configured to optimize the 3D propagation model used for the planning of the radio network in the first geographical region, by tuning one or more propagation path loss parameters of the 3D propagation model to compensate for propagation path losses associated with a Line-of-sight (LOS) transmission and a Non-line-of-sight (NLOS) transmission in the radio network, the tuning being performed based on a comparison of the generated one or more second network parameters with the at least one Key Point Indicator (KPI) of the 3D propagation model.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

The foregoing shall me more apparent from the following more detailed description of the present invention.

DETAILED DESCRIPTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention provides a system and method for 3D propagation modelling wherein automatic tuning of propagation path loss parameters of a Continuous Wave (CW) based 3D propagation model for LOS (line of sight) and NLOS (non-line of sight) radio transmissions in a first geographical area, is performed. Further, in the present invention, 3D propagation models for remaining geographies having similar geographical area and clutter types as the first geographical area, are generated without performing any drive test while compensating the propagation path loss parameters of the generated model using periodically measured user equipment (UE) data. The generated 3D models may be updated dynamically as the 3D models are developed based on UE data updated from time to time.

Figure 1:
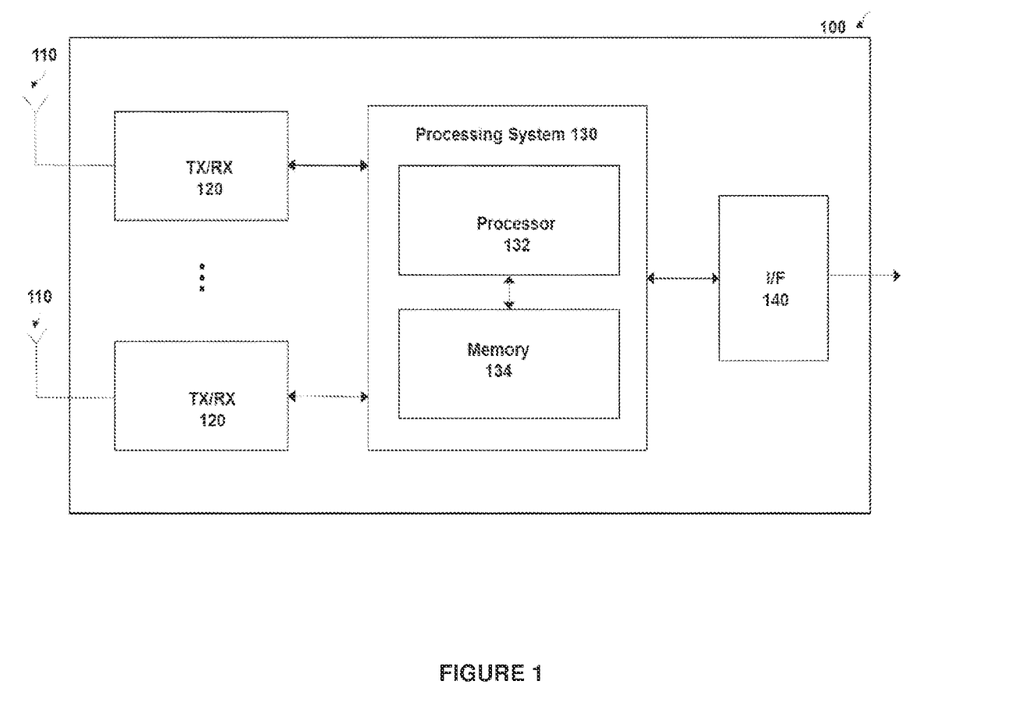
FIG. 1 is a diagram of exemplary components of a network entity, in accordance with an embodiment of the present invention.

FIG. 1 illustrates a diagram of exemplary components of a network entity [100]. As shown in FIG. 1, the network entity [100] may include antennas [110], transceivers (TX/RX) [120], a processing system [130], and an interface (I/F) [140]. In one embodiment, the antennas [110] may include one or more directional and/or omnidirectional antennas. Transceivers [120] may be associated with the antennas [110] and may include transceiver circuitry for transmitting and/or receiving symbol sequences in a network, such as a wireless network, via antennas [110].

The processing system [130] may control an operation of the network entity [100]. The processing system [130] may also process information received via the transceivers [120] and/or the interface [140]. As shown in FIG. 1, the processing system [130] may include a processor [132] and a memory [134]. In one embodiment, the processor [132] may include one or more processors, microprocessors, application specific integrated circuits (ASICs), field programmable gate arrays (FPGAs), and the like. The processor [132] may process information received via transceivers [120] and/or interface [140]. In addition, the processor [132] may transmit control messages and/or data messages and may cause those control messages and/or data messages to be transmitted via transceivers [120] and/or interface [140]. The processor [132] may also process control messages and/or data messages received from transceivers [120] and/or interface [140]. In one embodiment, the memory [134] may include a random access memory (RAM), a read-only memory (ROM), and/or another type of memory to store data and instructions that may be used by the processor [132].

In one embodiment, the interface [140] may include one or more circuitries, such as line cards that allow the network entity to transmit data to and receive data from another network entity. In another embodiment, the interface [140] may include I/O interfaces through which the network entity [100] may receive user inputs and/or data from a user.

In one embodiment, the network entity [100] may perform certain operations in response to the processor [132] executing software instructions of an application contained in a computer-readable medium, such as memory [134]. A computer-readable medium may be defined as a physical or logical memory device. A logical memory device may include memory space within a single physical memory device or spread across multiple physical memory devices. The software instructions may be read into memory [134] from another computer-readable medium or from another device via antennas [110] and transceivers [120]. The software instructions contained in memory [134] may cause the processor [132] to perform processes described herein. Alternatively, hardwired circuitry may be used in place of or in combination with software instructions to implement processes described herein. Thus, embodiments described herein are not limited to any specific combination of hardware circuitry and software.

Although FIG. 1 shows exemplary components of the network entity [100], in other embodiments, the network node may contain fewer, different, differently arranged, or additional components than depicted in FIG. 1. Alternatively, or additionally, one or more components of the network entity may perform one or more other tasks described as being performed by one or more other components of the network entity.

Figure 2:
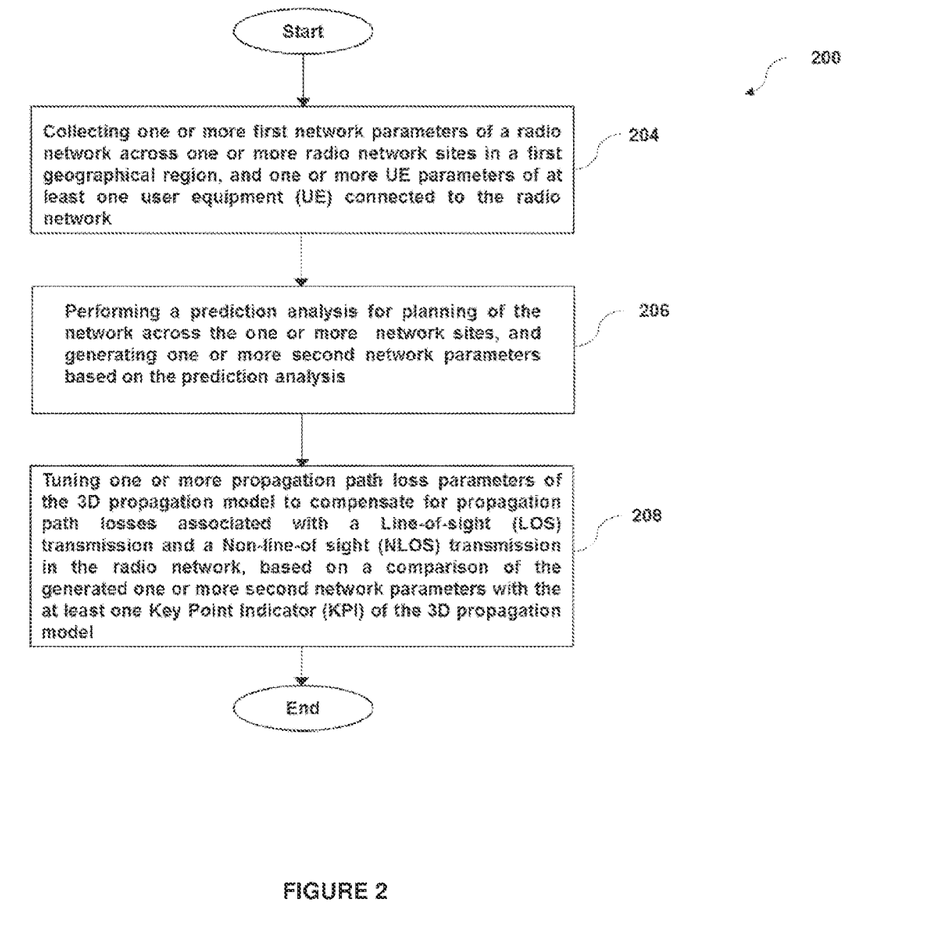
FIG. 2 is a simplified flow diagram of a method of 3D propagation modelling for the planning of a radio network, in accordance with an embodiment of the present invention.

Referring to FIG. 2, there is illustrated a simplified flow diagram of a method for 3D propagation modelling for planning of a radio network. Beginning at step [204], the network entity [100] collects one or more first network parameters of a radio network across one or more radio network sites in a first geographical region. Further, the network entity [100] collects one or more UE parameters of at least one user equipment (UE) connected to the radio network. The step [204] of FIG. 2 is further described in detail in step [204A]-[204E] of FIG. 3.

At step [206], the network entity [100] performs a prediction analysis for planning of the network across the one or more radio network sites. The prediction analysis is performed by using a Continuous-Wave (CW) based 3D propagation model with the collected one or more first network parameters, wherein based on the prediction analysis, one or more second network parameters for each of the one or more radio network sites are generated by the network entity [100]. The step [206] of FIG. 2 is further described in detail with reference to steps [206A]-[206G] of FIG. 4.

At step [208], the network entity [100] optimizes the 3D propagation model used for the planning of the radio network in the first geographical region, by tuning one or more propagation path loss parameters of the 3D propagation model to compensate for propagation path losses associated with a Line-of-sight (LOS) transmission and a Non-line-of-sight (NLOS) transmission in the radio network, based on a comparison of the generated one or more second network parameters with the at least one Key Point Indicator (KPI) of the 3D propagation model. The step [208] of FIG. 2 is described in more detail with reference to steps [208A]-[208E] of FIG. 5.

Figure 3:
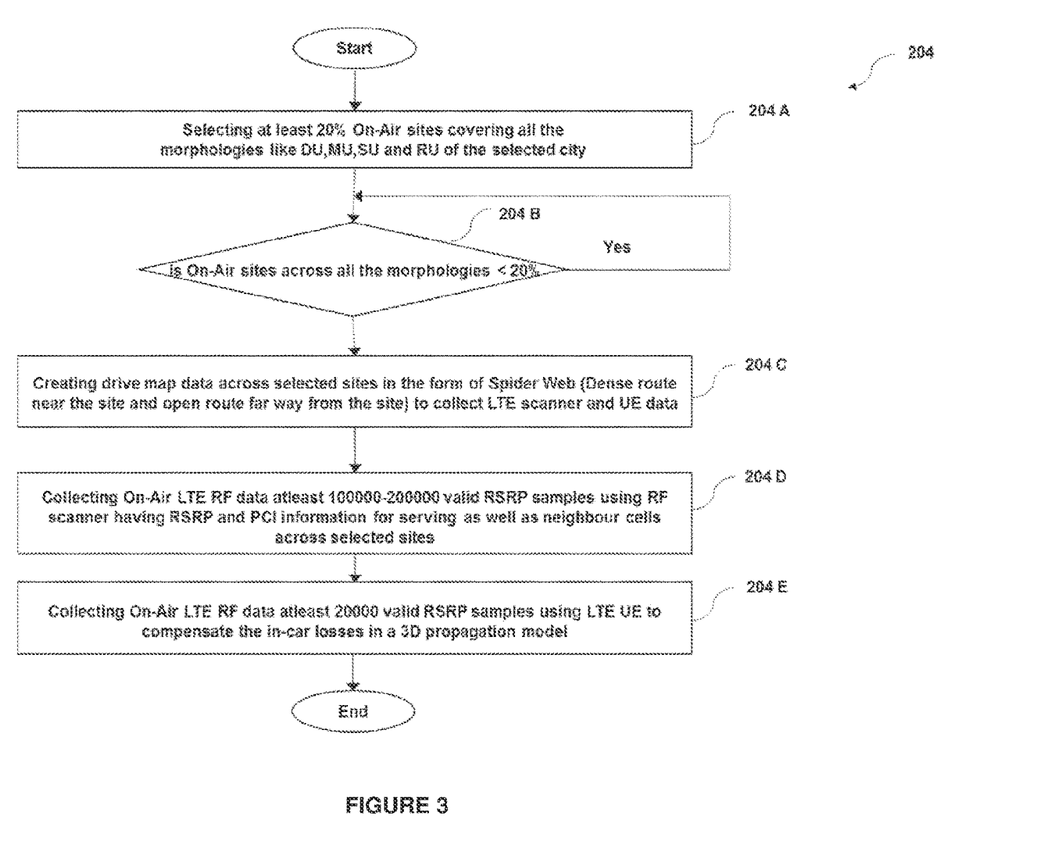
FIG. 3 is a simplified flow diagram illustrating the step [204] of FIG. 2 in detail.

Referring to FIG. 3, what shows a simplified flow diagram illustrating the step [204] of FIG. 2 in detail. At step [204A], the network entity [100] selects a predetermined number of on-air sites (i.e., radio network sites) covering all morphologies such as Dense urban (DU), medium urban (MU), suburban (SU), and rural (RU) of the first geographical region, such as a city. For example, the network entity [100] may select at least 20% radio network sites of a selected city out of total scope cities. Subsequently, at step [204B], the network entity [100] determines whether the radio network sites across all the morphologies are less than the predetermined number of sites, for example, less than 20%. In an event, the number of radio network sites is less than the predetermined number, the network entity [100] repeats the step [204A]. In an event, the radio network sites across all the morphologies are greater than the predetermined number of sites, then step [204C] is performed by the network entity [100].

At step [204C], drive route maps are created in and around the first geographical area to collect drive map data, wherein the drive map data may include at least the one or more network parameters and the one or more UE parameters. In one embodiment, the drive map data may be in the form of a Spider Web in which there may be a dense route near a radio network site and an open route far away from the radio network site. At step [204D], the network entity [100] may then collect the one or more network parameters including but not limited to Reference Signal Received Power (RSRP) data samples, for the radio network sites using an RF scanner. Further, the one or more network parameters may include Physical Cell Identity (PCI) information for a serving cell as well as neighbour cells across each of the one or more radio network sites. At step [204D], the network entity [100] may collect the one or more network parameters from an RF scanner, and at step [204E], the network entity [100] may collect the one or more network parameters from at least one UE.

Figure 4:
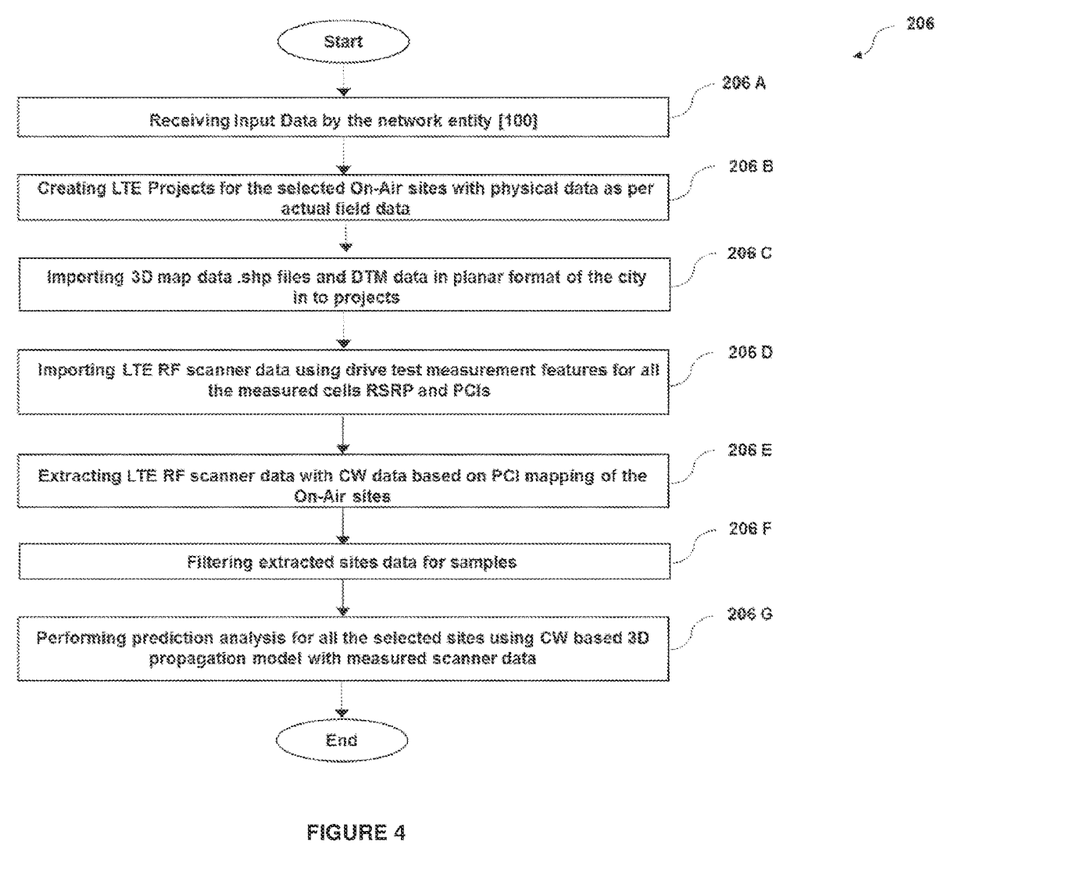
FIG. 4 is a simplified flow diagram illustrating the step [206] of FIG. 2 in detail.

Referring now to FIG. 4, that shows a simplified flow diagram illustrating the step [206] of FIG. 2 in detail. At step [206A], the network entity [100] receives an input data, wherein the input data is a pre-generated 3D map data. In one embodiment, the input data may include 3D building vector data of the first geographical region, Digital Terrain Model (DTM) having clutter height data of the first geographical region, an available Continuous Wave (CW) based 3D propagation model of any geographical region other than the first geographical region, database of on-air radio network sites of the first geographical region. Further, the collected one or more first network parameters are combined with the received input data, by the network entity [100]. At step [206B], a planning module for planning of the radio network across the radio network sites is created, wherein the planning of the radio network comprising at least one of: configuring of the one or more radio network sites, configuring of Reference Signal Energy Per Resource Element (RS-EPRE) parameter of the radio network across the one or more radio network sites, configuring of Physical Cell Identity (PCI) of cells across the radio network, configuring of antenna patterns of one or more antennas facilitating the radio network, and/or configuring of site physical parameters of the one or more radio network sites. The physical site parameters may include but are not limited to E-Tilt, M-Tilt and Azimuth.

Next, at steps [206C] and [206D], the input data is imported into the module created at step [206B]. At step [206E], the network entity [100] generates a scanner drive data for the one or more radio network sites based on the processing of the pre-generated 3D map data (i.e., the input data) along with the collected one or more first network parameters. Subsequently, at step [206F], the network entity [100] filters the generated scanner drive data to extract drive samples for generating predicted values, wherein the drive samples are extracted based on a comparison of the one or more first network parameters with predetermined reference values. For example, samples which are falling on buildings, having RSRP values <−120 dBm, having lower RSRP values near to the site and high RSRP value far away from the mapped PCI site, and being collected from more than 1 Km from the mapped PCI site, are filtered out from the generated drive samples. Thereafter, at step [206G], the network entity [100] performs the prediction analysis by using the 3D propagation model with the collected one or more network parameters and with the determined predicted values to generate the one or more second network parameters. In one embodiment, the one or more second network parameters correspond to parameters generated by prediction analysis between measured and predicted data on a drive path of the RF scanner of all PCI mapped radio network sites.

Figure 5:
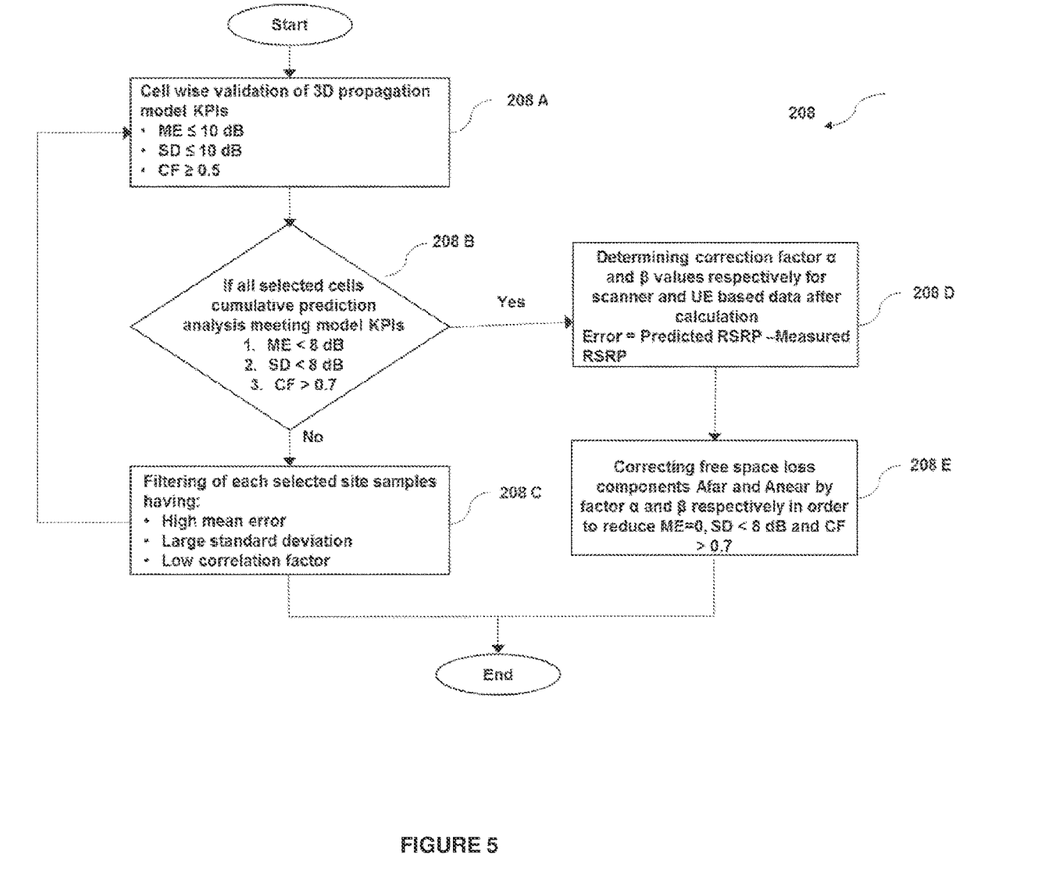
FIG. 5 is a simplified flow diagram illustrating the step [208] of FIG. 2 in detail.

Referring now to FIG. 5, that shows a simplified flow diagram illustrating the step [208] of FIG. 2 in detail. At step [208A], the network entity [100] performs cell-wise validation of key-point indicator (KPI)s of the 3D propagation model, wherein the KPIs may include but not limited to Mean Error (ME), Standard Deviation (SD) and Correlation Factor (CF). The network entity [100] determines the Mean Error (ME), Standard Deviation (SD) and Correlation Factor (CF) samples for each of the radio network site, wherein the ME, SD, and CF are determined for the serving cell and the neighbouring cells in each of the radio network site. At step [208B], the network entity [100] determines whether cumulative prediction analysis of the radio network sites, as described in step [206], matches one or more pre-stored reference KPIs of the 3D propagation model. In an event, the cumulative prediction analysis matches the pre-stored reference KPIs, the step [208D] is performed, else the step [208C] is performed. At step [208C], the network entity [100] filters samples of the radio network sites having a high value of mean error, low correlation and high standard deviation, after the prediction analysis is performed.

At step [208D], the network entity [100] determines correction factor $\alpha$ and $\beta$ values, respectively for the one or more first network parameters collected from the RF scanner and the UE. The correction factor is determined after calculating an error based on the difference between the predicted RSRP and the measured RSRP. At step [208E], the network entity [100] performs tuning of one or more propagation path loss parameters of the 3D propagation model by correcting the one or more propagation path loss parameters based on the determined correction factor $\alpha$ and $\beta$ so that the KPIs of the 3D propagation model matches the at least one pre-stored reference KPI. The one or more propagation path loss parameters are tuned to compensate for propagation path losses associated with a Line-of-sight (LOS) transmission and a Non-line-of-sight (NLOS) transmission in the radio network. In one exemplary embodiment, the one or more propagation path loss parameters are tuned so that the KPIs of the 3D propagation model matches Mean Error (ME)=0, Standard Deviation (SD)<8 dB and Correlation Factor (CF)>0.7.

Figure 6:
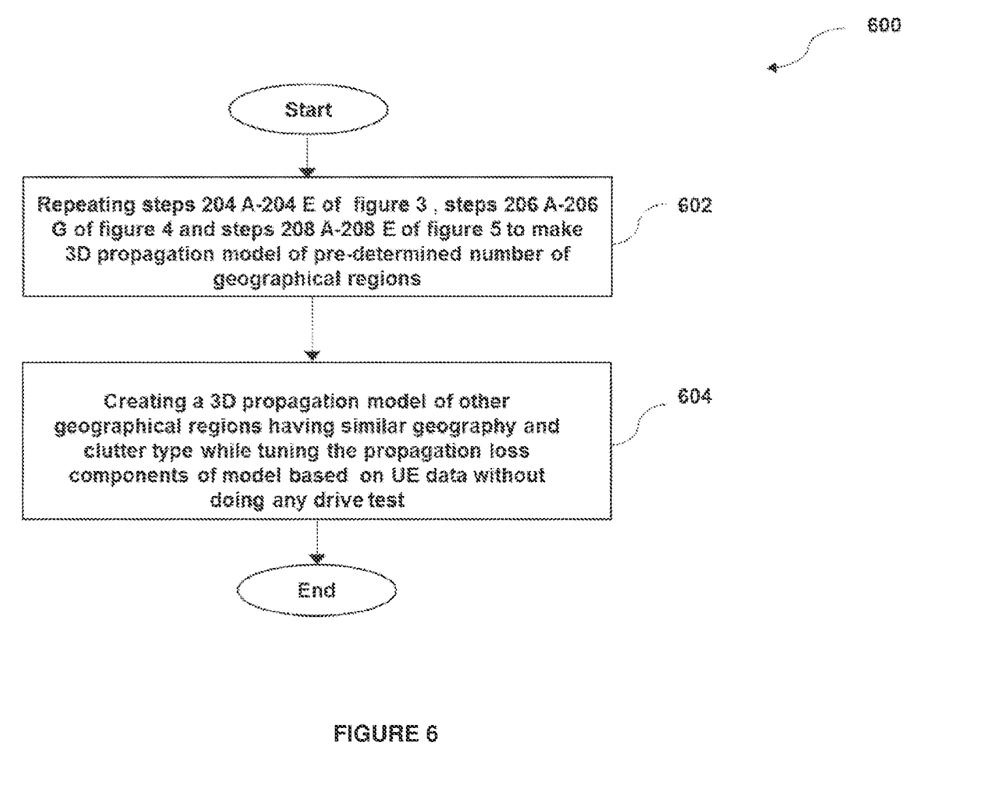
FIG. 6 is a simplified flow diagram illustrating obtaining of 3D propagation models of remaining geographies from a 3D propagation model of a first geography, in accordance with an embodiment of the present invention.

Referring to FIG. 6, a simplified flow diagram for generating 3D propagation models of other geographies based on a generated 3D propagation model of a first geography, is disclosed. At step 602, the network entity [100] may repeat the aforementioned steps 204A-204E of FIG. 3, steps 206A-206G of FIG. 4 and steps 208A-208E of FIG. 5 to make a 3D propagation model of the pre-determined number of geographical regions other than the first geographical region. At step [604], the network entity [100], may create a 3D propagation model of other geographical regions having similar geography and clutter type as of the first geographical region, while tuning the propagation path loss components of the generated model based on UE data which is periodically received from a user equipment (UE), without requiring to perform a drive test using the RF scanner.

For example, assuming that RF scanner based drive data is collected for 'n' number of radio network sites. The mean value of RSRP error between predicted data by an RF planning tool and scanner based measured data for n sites are $a_1, a_2, a_3, \ldots, a_n$ and their correlation factors with RF prediction data are $c_1, c_2, c_3, \ldots, c_n$. Further, the standard deviation of n sites are $\sigma_1, \sigma_2, \sigma_3, \ldots, \sigma_n$. As per the method described above in the disclosure, overall mean error for drive data of the entire city is derived by, $$\alpha = \frac{\sum_i^n \mu_i a_i}{\sum_i^n \mu_i} \qquad (3)$$

Where, $\mu_i \in \{0,1\}$
$\mu_i=0$ for $c_i<0.5$ and $\mu_i=1$ for $0.5<c_i<1$, $i=1,2,3,\ldots,n$
wherein, equation (3) shows that the value of $\alpha$ is within the confidence interval of correlation.

In one aspect, overall Standard deviation (SD) will be derived by, $$SD = \sqrt{\frac{1}{\sum_{i=1}^n \mu_i} \sum_{i=1}^n |\sigma_i - \alpha|^2} \qquad (4)$$

Based on (2), (3) and (4) and considering $\beta$ as a UE data correction factor with respect to RF scanner received power, the near field and far field offset correction factor 'A' in a 3D propagation model will be replaced by 'A1' as below:

$$A1 = A(\text{far,near}) + \alpha + \beta \qquad (5)$$

Therefore, modified (2) and (5) for received power based on the above methodology will be:

$$\text{Received Power}_{new} = EIRP - (A1 + B \cdot \log_{10}(D) + \gamma \cdot L_{DET} + L_{ANT} + L_{FS} + L_C) \qquad (6)$$

The above equation (6) may be used for 3D predictions with the condition of Standard deviation (SD)<8, otherwise, convergence cannot be achieved within confidence interval because of larger deviation from mean path.

Figure 7:
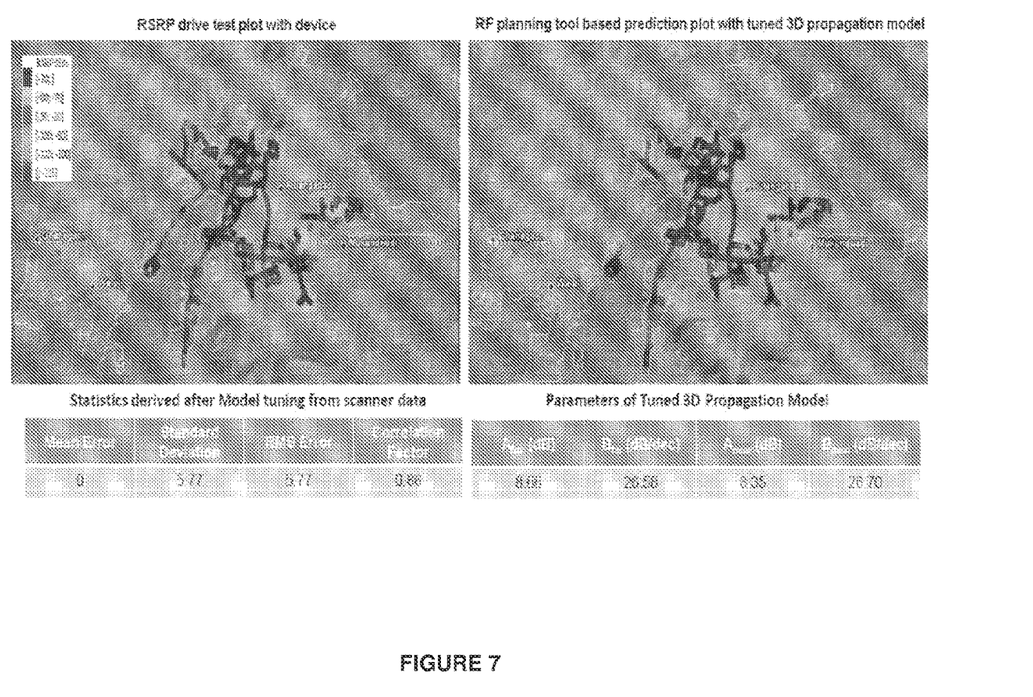
FIG. 7 illustrates the prediction and measurement sample correlation along with 3D propagation model parameters for Aurangabad city based on the implementation of the present invention.
Figure 8:
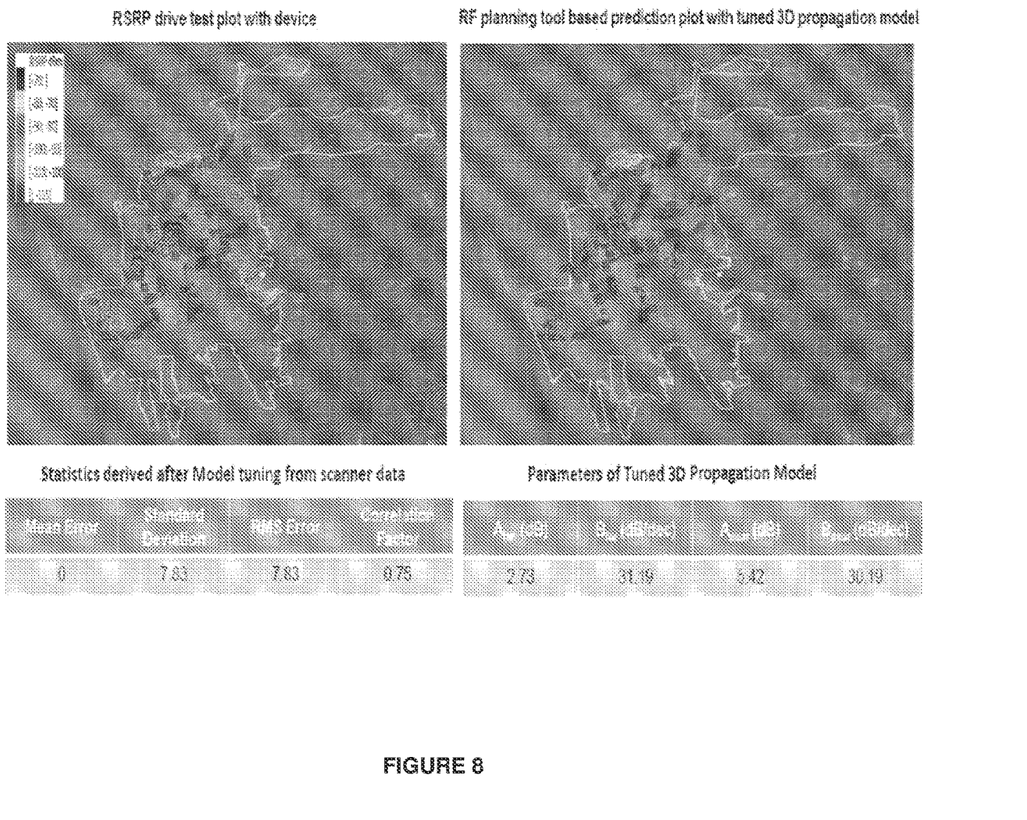
FIG. 8 illustrates the prediction and measurement sample correlation along with 3D propagation model parameters for Kochi city based on the implementation of the present invention.
Figure 9:
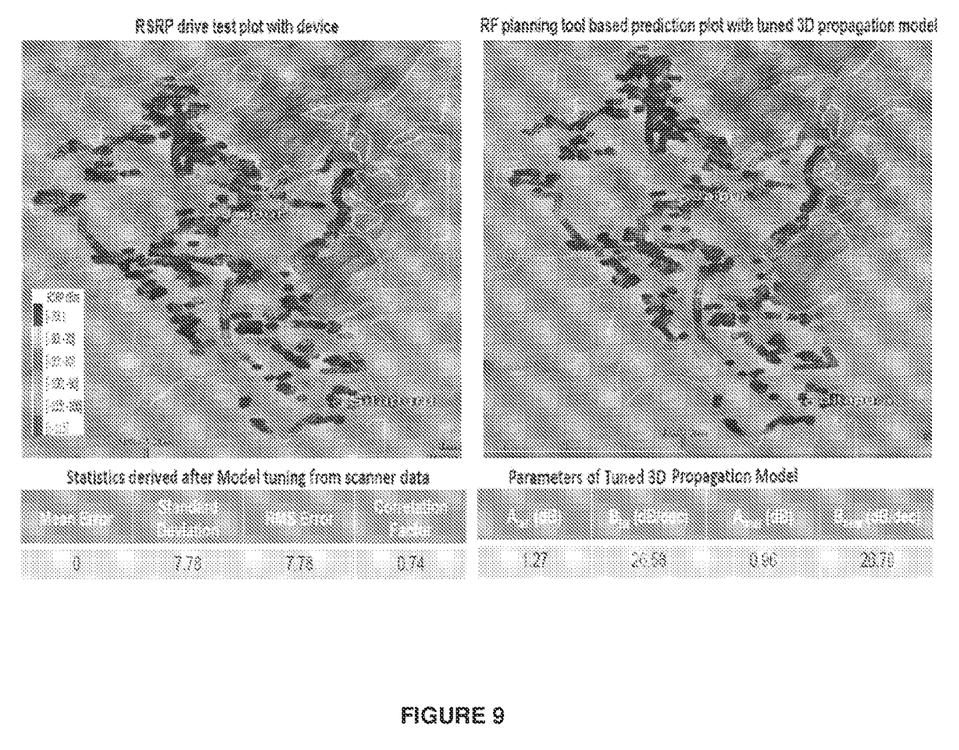
FIG. 9 illustrates the prediction and measurement sample correlation along with 3D propagation model parameters for Jaipur city based on the implementation of the present invention.
Figure 10:
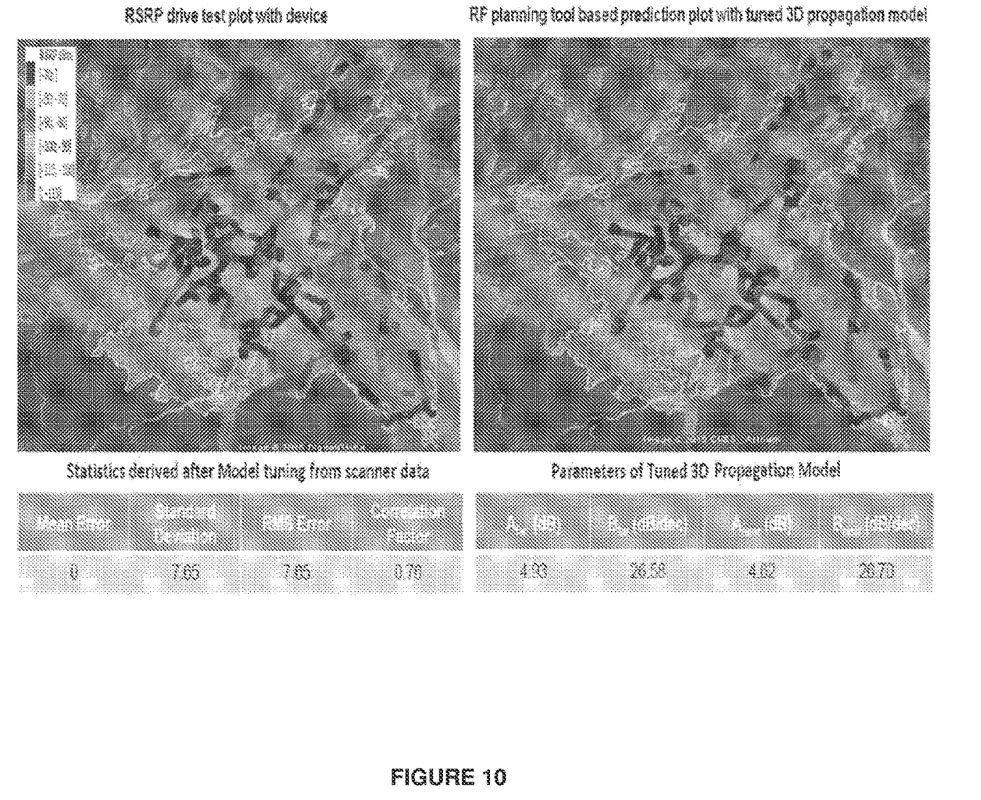
FIG. 10 illustrates prediction and measurement sample correlation along with 3D propagation model parameters for Dehradun city based on the implementation of the present invention.
Figure 11:
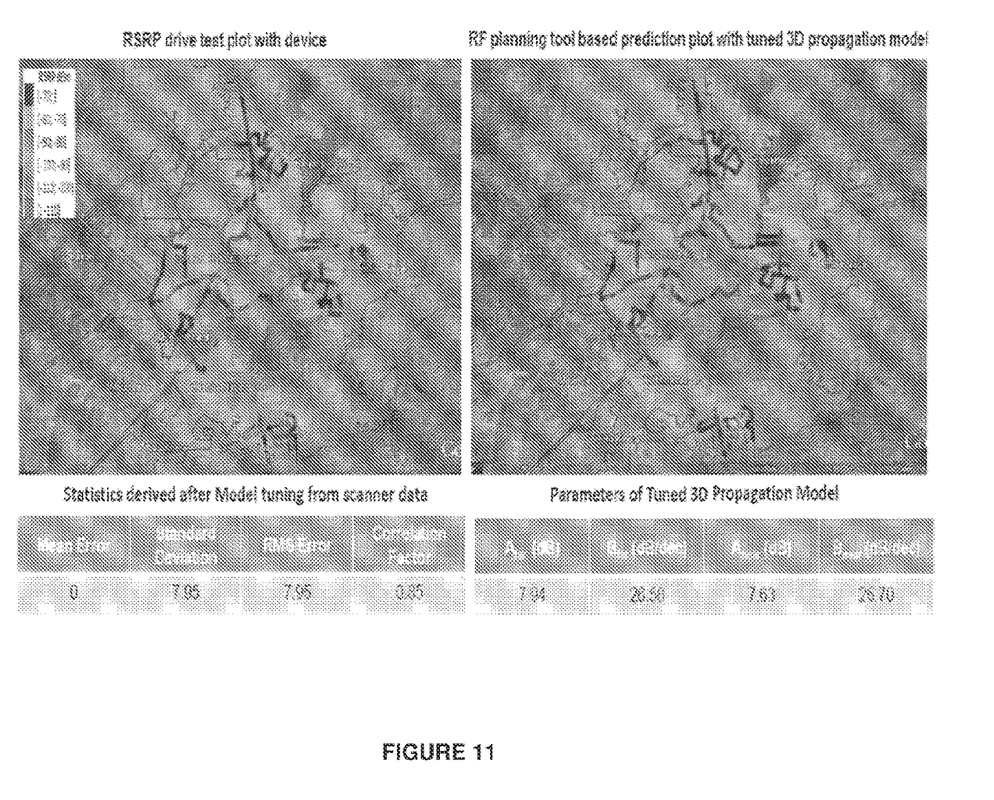
FIG. 11 illustrates the prediction and measurement sample correlation along with 3D propagation model parameters for Lucknow city based on the implementation of the present invention.

Referring to FIG. 7-FIG. 11, implementation of the system and method of the present invention is described. The system and method of the present invention has been implemented for 3D propagation modelling for the planning of a radio network across five different cities Aurangabad, Kochi, Jaipur, Dehradun, and Lucknow, respectively. A comparison between values based on tuned 3D propagation model as per the current invention and data obtained from an RSRP drive test of these cities is shown. FIG. 7 shows prediction and measurement sample correlation along with 3D propagation model parameters for Aurangabad city. FIG. 8 shows the prediction and measurement sample correlation along with 3D propagation model parameters for Kochi city. FIG. 9 shows the prediction and measurement sample correlation along with 3D propagation model parameters for Jaipur city. FIG. 10 shows prediction and measurement sample correlation along with 3D propagation model parameters for Dehradun city. FIG. 11 shows prediction and measurement sample correlation along with 3D propagation model parameters for Lucknow city.

The units, interfaces, modules, and/or components depicted in the figures and described herein may be present in the form of a hardware, a software and a combination thereof. Connection/s shown between these units/components/modules/interfaces in the exemplary system architecture [100A] may interact with each other through various wired links, wireless links, logical links and/or physical links. Further, the units/components/modules/interfaces may be connected in other possible ways.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method of 3D propagation modelling for planning of a radio network, the method being performed by a network entity, the method comprising:
   collecting, by a processor, one or more first network parameters of a radio network across one or more radio network sites in a first geographical region, wherein the one or more first network parameters are collected from a Radio Frequency (RF) scanner and from at least one user equipment (UE) simultaneously;
   performing, by the processor, a prediction analysis for planning of the network across the one or more radio network sites, wherein the prediction analysis is performed by using a Continuous-Wave (CW) based 3D propagation model with the collected one or more first network parameters, wherein based on the prediction analyses, one or more second network parameters for each of the one or more radio network sites are generated; and
   optimizing, by the processor, the 3D propagation model used for the planning of the radio network in the first geographical region, by tuning one or more propagation path loss parameters of the 3D propagation model to compensate for propagation path losses associated with a Line-of-sight (LOS) transmission and a Non-line-of-sight (NLOS) transmission in the radio network, the tuning being performed based on a comparison of the generated one or more second network parameters with the at least one Key Point Indicator (KPI) of the 3D propagation model.

2. The method as claimed in claim 1 comprising:
   determining a Continuous-Wave (CW) based 3D propagation model for a second geographical region based on the 3D model of the first geographical region,
   wherein the second geographical region is having a similar clutter type and geography as of the first geographical region, and
   wherein the one or more propagation path loss parameters of the 3D propagation model of the second geographical region are tuned for compensating propagation path losses associated with the LOS transmission and the NLOS transmission, based on one or more UE parameters collected periodically from a UE present in the radio network across the second geographical region.

3. The method as claimed in claim 1,
   wherein the one or more network parameters are collected using a RF scanner, and
   wherein the one or more first network parameters comprising at least Reference Signals Received Power (RSRP) data and Physical Cell Identity (PCI) of a serving cell and neighbouring cells across each of the one or more radio network sites.

4. The method as claimed in claim 1, wherein the one or more first network parameters are collected along a plurality of drive route maps which are created around the one or more radio network sites.

5. The method as claimed in claim 1, wherein the planning of the radio network comprising at least one of: configuring of the one or more radio network sites, configuring of Reference Signal Energy per Resource Element (RS-EPRE) parameter of the radio network across the one or more radio network sites, configuring of Physical Cell Identity (PCI) of cells across the radio network, configuring of antenna patterns of one or more antennas facilitating the radio network, and/or configuring of site physical parameters including E-Tilt, M-Tilt and Azimuth of the one or more radio network sites.

6. The method as claimed in claim 1 comprising:
   processing a pre-generated 3D map data along with the collected one or more first network parameters, using the 3D propagation model;
   generating, using the 3D propagation model, a scanner drive data for the one or more radio network sites based on said processing of the pre-generated 3D map data along with the collected one or more network parameters; and
   determining predicted values depending on the generated scanner drive data.

7. The method as claimed in claim 6, wherein the prediction analysis is performed by using the 3D propagation model with the collected one or more network parameters and with the determined predicted values.

8. The method as claimed in claim 6, wherein the scanner drive data comprises drive samples which are obtained from the one or more first network parameters, based on a comparison of the one or more first network parameters with predetermined reference values.

9. The method as claimed in claim 1, wherein the at least one KPI comprises: Mean Error (ME), Standard Deviation (SD), and Correlation Factor (CF) for each of the one or more radio network sites.

10. The method as claimed in claim 9, comprising:

comparing the generated one or more second network parameters with the at least one KPI;
determining a correction factor for the one or more first network parameters, based on said comparison; and
tuning the one or more propagation path loss parameters by correcting the one or more propagation path loss parameters based on the correction factor, so that the at least one KPI of the 3D propagation model matches at least one pre-stored reference KPI.

11. A network entity [100] for 3D propagation modelling for planning of a radio network, the network entity [100] comprising:
a processor [132] configured to:
collect one or more first network parameters of a radio network across one or more radio network sites in a first geographical region, wherein the one or more first network parameters are collected from a Radio Frequency (RF) scanner and from at least one user equipment (UE) simultaneously;
perform a prediction analysis for planning of the network across the one or more radio network sites, wherein the prediction analysis is performed by using a Continuous-Wave (CW) based 3D propagation model with the collected one or more first network parameters, wherein based on the prediction analyses, one or more second network parameters for each of the one or more radio network sites are generated; and
optimize the 3D propagation model used for the planning of the radio network in the first geographical region, by tuning one or more propagation path loss parameters of the 3D propagation model to compensate for propagation path losses associated with a Line-of-sight (LOS) transmission and a Non-line-of-sight (NLOS) transmission in the radio network, the tuning being performed based on a comparison of the generated one or more second network parameters with the at least one Key Point Indicator (KPI) of the 3D propagation model.

12. The network entity [100] as claimed in claim 11, wherein the processor [132] is configured to:
determine a Continuous-Wave (CW) based 3D propagation model for a second geographical region based on the 3D model of the first geographical region,
wherein the second geographical region is having a similar clutter type and geography as of the first geographical region, and
wherein the one or more propagation path loss parameters of the 3D propagation model of the second geographical region are tuned for compensating propagation path losses associated with the LOS transmission and the NLOS transmission, based on one or more UE parameters collected periodically from a UE present in the radio network across the second geographical region.

13. The network entity [100] as claimed in claim 11, wherein the one or more network parameters are collected using a RF scanner, and wherein the one or more first network parameters comprising at least Reference Signals Received Power (RSRP) data and Physical Cell Identity (PCI) of a serving cell and neighbouring cells across each of the one or more radio network sites.

14. The network entity [100] as claimed in claim 11, wherein the one or more first network parameters are collected along a plurality of drive route maps which are created around the one or more radio network sites.

15. The network entity [100] as claimed in claim 11, wherein the planning of the radio network comprising at least one of: configuring of the one or more radio network sites, configuring of Reference Signal Energy per Resource Element (RS-EPRE) parameter of the radio network across the one or more radio network sites, configuring of Physical Cell Identity (PCI) of cells across the radio network, configuring of antenna patterns of one or more antennas facilitating the radio network, and/or configuring of site physical parameters including E-Tilt, M-Tilt and Azimuth of the one or more radio network sites.

16. The network entity [100] as claimed in claim 11, wherein the processor [132] is configured to:
process a pre-generated 3D map data along with the collected one or more first network parameters, using the 3D propagation model;
generate, using the 3D propagation model, a scanner drive data for the one or more radio network sites based on said processing of the pre-generated 3D map data along with the collected one or more network parameters; and
determine predicted values depending on the generated scanner drive data.

17. The network entity [100] as claimed in claim 16, wherein the prediction analysis is performed by using the 3D propagation model with the collected one or more network parameters and with the determined predicted values.

18. The network entity [100] as claimed in claim 16, wherein the scanner drive data comprises drive samples which are obtained from the one or more first network parameters, based on a comparison of the one or more first network parameters with predetermined reference values.

19. The network entity [100] as claimed in claim 11, wherein the at least one KPI comprises: Mean Error (ME), Standard Deviation (SD), and Correlation Factor (CF) for each of the one or more radio network sites.

20. The network entity [100] as claimed in claim 19, wherein the processor [132] is configured to:
compare the generated one or more second network parameters with the at least one KPI;
determine a correction factor for the one or more first network parameters, based on said comparison; and
tune the one or more propagation path loss parameters by correcting the one or more propagation path loss parameters based on the correction factor, so that the at least one KPI of the 3D propagation model matches at least one pre-stored reference KPI.

* * * * *